United States Patent [19]

Radtke et al.

[11] Patent Number: 5,234,667
[45] Date of Patent: Aug. 10, 1993

[54] CENTRIFUGE TUBE FOR IMPROVED PELLET RETENTION

[75] Inventors: Klaus-Peter Radtke, Giessen, Fed. Rep. of Germany; Arthur J. Robbins, Mountain View, Calif.

[73] Assignee: The Scripps Research Institute, La Jolla, Calif.

[21] Appl. No.: 829,808

[22] Filed: Feb. 3, 1992

[51] Int. Cl.⁵ .................................. B01L 3/00
[52] U.S. Cl. ........................... 422/102; 422/99; 422/72; 435/299; 435/296
[58] Field of Search ............... 422/102, 99, 73, 72; 494/16, 17, 18; 215/306; 220/375; 436/165; 435/299, 296

[56] References Cited

U.S. PATENT DOCUMENTS

| | | | |
|---|---|---|---|
| 3,841,838 | 10/1974 | Natelson | 422/102 |
| 4,579,828 | 4/1986 | Ali | 422/73 |
| 4,713,219 | 12/1987 | Gerken et al. | 422/102 |
| 4,755,356 | 7/1988 | Robbins et al. | 422/102 |
| 4,902,270 | 2/1990 | Comeau et al. | 422/102 |
| 4,956,103 | 9/1990 | Jessop et al. | 422/102 |
| 5,084,240 | 1/1992 | Babson | 422/102 |

Primary Examiner—James C. Housel
Assistant Examiner—Lien Tran
Attorney, Agent, or Firm—Michael J. Hughes

[57] ABSTRACT

A centrifuge tube has elongated hollow vessel, and the vessel has a closed bottom end. A portion of the inner surface of the vessel is roughened near the closed bottom end, e.g., by micropitting the portion such that the solid pellet or precipitate that is separated from the supernatant of a specimen during centrifuging is retained on the roughened portion when the supernatant is drawn out of the tube subsequent to centrifuging. If desired, a sticky substance can be deposited on the roughened portion of the inner surface to further facilitate retention of the pellet on the roughened portion when the supernatant is drawn out of the tube subsequent to centrifuging.

14 Claims, 2 Drawing Sheets

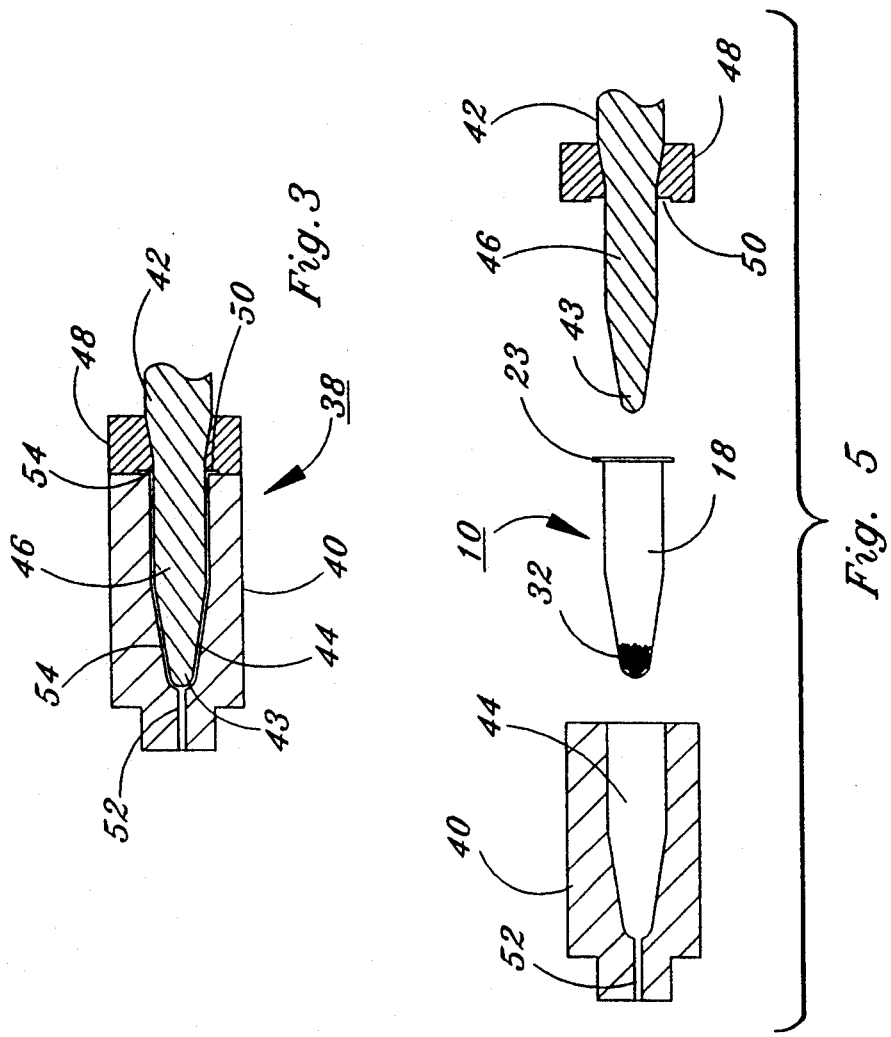
Fig. 3
Fig. 5
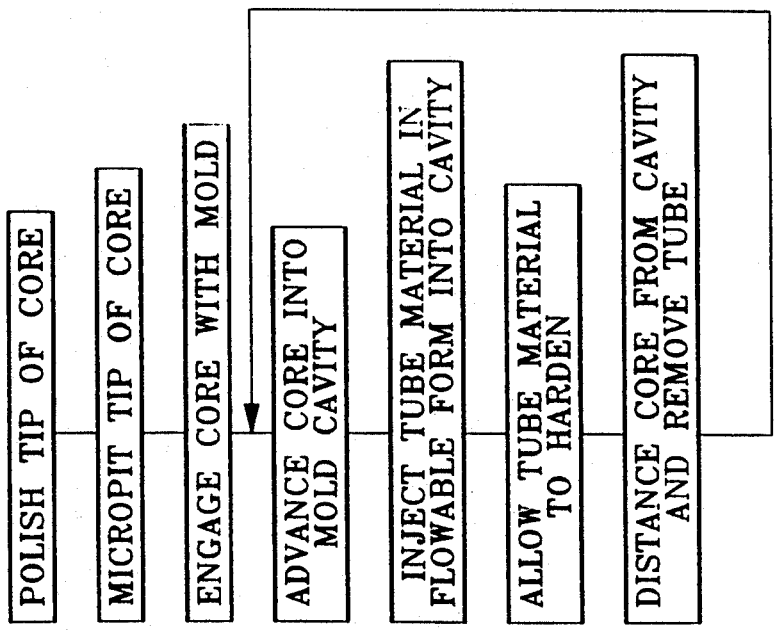
Fig. 4

CENTRIFUGE TUBE FOR IMPROVED PELLET RETENTION

FIELD OF THE INVENTION

The present invention relates generally to laboratory test equipment, and more particularly to centrifuge tubes.

BACKGROUND OF THE INVENTION

The centrifuge is one member of a substantial class of tools and equipment used in the laboratory, and it plays an important role in a wide variety of applications, including clinical applications or biochemical research. It is of particular importance in the field of molecular biology, where everything from tissue cultures to micromolecules is the focus of study.

For example, it is known to use a centrifuge to separate the liquid and solid phases of blood using a centrifuge. The preparation of a viable culture of white blood cells prefatory to culturing those cells for the purpose of preparing a karyotype, for example, requires that all fluids and other cellular components be removed from a blood sample. It is not uncommon, then, for a technician to add substances that will lyse the red blood cells, and then spin the blood sample in a centrifuge to separate the liquid and solid components. Liquid components, i.e., the supernatant, tend to rise to the top. Solid components tend to aggregate at the bottom of the tube in a mass commonly called a precipitate or a "pellet".

If the pellet is of interest, the technician may then pipet the supernatant away, or remove it by some other means such as pouring or wicking it away, in a manner that does not disturb the pellet. If the supernatant is of interest, it is preferably removed in a way that does not disturb the pellet and cause re-mixing of the solid and liquid phases.

Conventional centrifuge tubes, particularly microcentrifuge tubes, do not always facilitate the separation of pellet and supernatant. In particular, pelleted material in molecular biology is frequently very small and may even be invisible to the naked eye. Because the molecule(s) of interest is often a very small component of the overall sample under study, it is not unusual to require the removal of great volumes of supernatant. Since the pellet must often be suspended and re-suspended in an effort to "purify" or "concentrate" it as much as possible, it is of critical importance to retain as much of the pellet as possible when subjecting it to serial suspensions. Similarly, if one is attempting to obtain a sample of supernatant with minimal or no suspended particles, a device or method that would improve one's chances of obtaining a purer sample would be extremely valuable.

While liquid materials may be poured off, supernatants are typically removed via the use of suction devices. These devices tend to have pipette-like tips and may be operated manually or with the assistance of vacuum devices. Use of suction devices creates some difficulties where, as is often the case, the pellet is small and difficult to see. The pelleted material at the bottom of the tube is easily dislodged, and may become re-suspended in the supernatant or lost altogether. These difficulties are further exacerbated by the extremely smooth interior surfaces of centrifuge tubes.

Therefore, it is an object of the present invention to provide a tube for use in centrifugation which will not interfere with the formation of the precipitate (pellet) and supernatant phases, but which will also facilitate the separation of those phases with a minimum loss of material. It is a further object of the present invention to provide a method for making such a tube. Another object of the present invention is to provide a centrifuge tube which is easy to use and cost-effective to manufacture.

SUMMARY OF THE INVENTION

A centrifuge tube for holding a specimen in a centrifuge includes a hollow vessel having an open end and a closed end. The centrifuge can be a laboratory centrifuge that has at least one tube receptacle, and the vessel is adapted for operably engaging the receptacle of the centrifuge.

In accordance with the present invention, a portion of the inner surface of the vessel is micropitted near the closed end of the vessel, and precipitates that are separated from the liquid phase of the specimen during centrifugation are retained in the micropitted portion when the liquid phase is removed from the vessel subsequent to centrifugation. To further retain the precipitate in the vessel, a sticky substance or other coating designed to attract or retain a pellet can be deposited on the micropitted portion or on the inner surface of the vessel in lieu of micropitting the vessel.

In another aspect of the present invention, the interior surface of a centrifuge tube is roughened near the bottom portion of the tube. The introduction of a rough, micropitted surface portion at the bottom of the interior of a centrifuge tube, and more particularly, a microcentrifuge tube, facilitates the adherence of solid precipitate (in the form of a "pellet") to the tube surface after the precipitate has been separated from the supernatant component of a specimen by centrifuging. This decreases the likelihood that the pellet will dislodge and/or be lost or resuspended in the supernatant during removal of the supernatant.

The rough region within the tube is preferably limited to a small region, one about the size of the expected pellet, thus leaving most of the interior surface of the tube smooth, and preventing adherence of the pellet to areas of the tube other than the bottom region.

When the centrifuge tube is a microcentrifuge tube, the roughened interior surface portion preferably occupies an area that surrounds the lower $50\mu$–$100\mu l$ volume of the tube. However, other roughened portion sizes may be appropriate, depending upon the dimensions of the tube and the nature of the biological/chemical material that is being subjected to centrifugation. The use of tubes having roughened portions of an interior surface may be extended to any kind of reagent tube for applications involving the use of centrifugation or other means of effecting precipitate/supernatant separation where pellet dislodging or re-suspension may be a problem.

In addition to a roughened area, or alternatively, a sticky substance or other coating designed to attract or retain a pellet can be deposited on an interior surface near the bottom of the tube. For example, if it is desired to capture a largely hydrophilic pellet, the bottom interior portion of the tube could be coated with a hydrophilic substance, whereas the remainder of the interior tube surface could be coated with a hydrophobic material. If, on the other hand, it is desired to capture a largely hydrophobic pellet, the "sticky" lower portion could be coated with a hydrophobic substance and the remainder of the interior could have a hydrophilic coating.

The centrifuge tube of the present invention may be made according to a variety of known processes; however, it is preferably manufactured by an injection molding process. Specifically, the vessel material (e.g., plastic or glass) in a flowable state is injected into a mold, and the mold includes a core that conforms to the intended shape of the interior of the vessel. One end of the core is micropitted via an appropriate process, such as by first polishing the end of the core and then acid etching the core, or by directing sand or glass beads against the end of the core. When the flowable material hardens after the molding process to form the interior surface of the vessel of the centrifuge tube of the present invention, the vessel has a micropitted portion near its closed end corresponding to the micropitted end of the core. A centrifuge tube made without the roughened area (i.e., a tube having only a sticky coating) would not require the use of a micropitted core. In another variation, a plurality of centrifuge tubes in accordance with the present invention can be molded together or connected together, to establish a centrifuge tube assembly.

The details of the construction of the present invention, as well as the operation thereof, can best be understood in reference to the accompanying drawings, in which like numerals refer to like parts.

BRIEF DESCRIPTION OF THE DRAWINGS

FIG. 3 is a schematic view of an injection molding apparatus used to manufacture the centrifuge tube of the present invention, with the core advanced into the cavity of the mold;

FIG. 4 is a block diagram showing the steps of manufacturing the centrifuge tube of the present invention; and FIG. 5 is a schematic view of the injection molding apparatus used to manufacture the centrifuge tube of the present invention, with the core distanced from the cavity of the mold, showing the formed centrifuge tube.

DESCRIPTION OF THE PREFERRED EMBODIMENT

Figure 1:
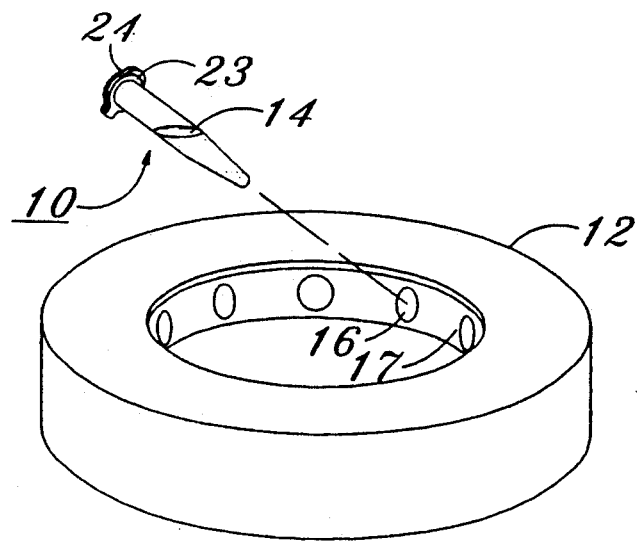
FIG. 1 is a perspective view of the centrifuge tube of the present invention, shown in an exploded relationship with a portion of a laboratory centrifuge.

Referring initially to FIG. a centrifuge tube, generally designated 10, is shown in an exploded relationship with a portion of a centrifuge 12. The centrifuge tube 10 holds a specimen 14 within the centrifuge 12. To this end, the centrifuge 12 has at least one receptacle 16, and the centrifuge tube 10 is configured for operably engaging the receptacle 16.

The centrifuge 12 is any appropriate laboratory centrifuge that is suitable for separating the specimen 14 into a liquid phase (i.e., the supernatant) and a solid phase (i.e., the precipitate). In one preferred embodiment, the centrifuge tube 10 is a microcentrifuge tube. After centrifuging, the solid phase of the specimen 14, often termed a "pellet", is typically deposited at the bottom of the centrifuge tube 10.

Figure 2:
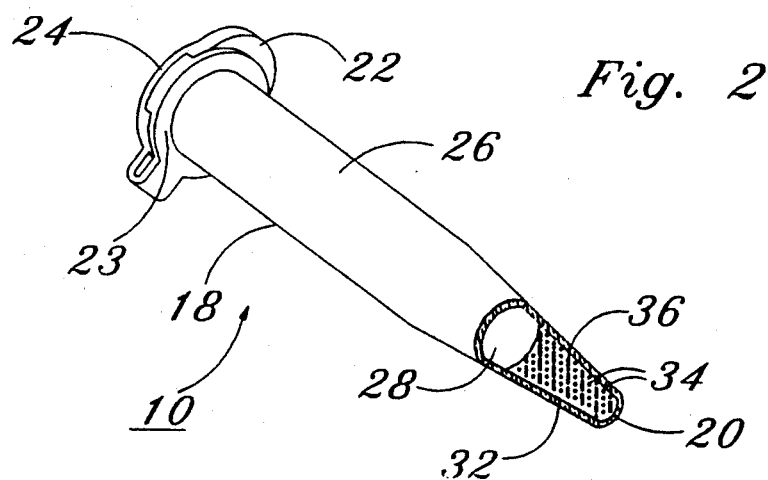
FIG. 2 is a perspective view of the centrifuge tube of the present invention, with portions cut away for clarity, in an empty state.

Now referring to FIG. 2, the centrifuge tube 10 includes a hollow vessel 18. Preferably, the vessel 18 is made of a material that is transparent and that is sufficiently strong to withstand the stresses that are imposed on the vessel 18 during centrifuging. Suitable materials include glass, as well as plastics such as polypropylene, polystyrene, and polyethylene.

As shown in FIG. 2, the vessel 18 has a closed bottom end 20 and a selectively coverable top end 22. More specifically, the top end 22 can be selectively covered by a cap 24. The cap 24 can be any suitable device that will prevent the passage of fluid through the top end 22 of the vessel 18. In the embodiment shown, the cap 24 is preferably the sealing/locking cap that is the subject matter of U.S. Pat. No. 4,755,356, to one of the co-inventors of the present invention, the disclosure of which is incorporated herein by reference.

FIG. 2 also shows that the top end 22 of the vessel 18 is circumscribed by a flange 23, and that the flange 23 is configured for mating engagement with a seating surface 17 (shown in FIG. 1) of the receptacle 14 of the centrifuge 12. Also, the vessel 18 has an outer surface 26 and an inner surface 28. As shown, the outer surface 26 is substantially smooth, as is a majority of the inner surface 28.

On the other hand, a distal portion 32 of the inner surface 28 is roughened, such that solid pellets 33 (FIG. 2A) that are separated from the liquid phase 35 (FIG. 2A) of the specimen 14 during centrifugation are retained in the distal portion 32 after centrifugation, and will remain in the distal portion 32 when the liquid phase is removed from the vessel 18. Preferably, the distal portion 32 of the inner surface 28 is micropitted. More preferably, the distal portion 32 of the inner surface 28 has a plurality of pits 34, and the overall area of the roughened surface is approximately equal to the size of the expected pellet of the specimen 14.

As FIG. 2 also shows, most of the inner surface 28 is smooth, preventing the attachment of the pellet to surface areas other than the distal portion 32. For example, when the centrifuge tube 10 is a microcentrifuge tube, the roughened, distal portion 32 would preferably start at approximately the fifty to one hundred microliters (50μl–100μl) line and extend to the bottom end 20 of the vessel 18. In other words, when the centrifuge tube 10 is a microcentrifuge tube, the roughened, distal portion 32 would preferably surround the bottom 50μl–100μl of the vessel 18.

If desired, a sticky substance 36 can be deposited on the distal portion 32, to further facilitate the retention of pellets on the inner surface 28 when the liquid phase of the specimen 14 is removed from the vessel 18 subsequent to centrifugation. Indeed, in an alternative embodiment, the distal portion 32 can be smooth, and the sticky substance 36 can be deposited on the distal portion 32 in lieu of micropitting.

The selection of the "sticky" material is preferably a function of the chemical characteristics of the pellet and/or the supernatant. For example, when the pellet from the specimen 14 is hydrophilic, the sticky substance 36 applied to the distal portion 32 is hydrophilic. In such an embodiment, the remaining portion of the inner surface 28 can be left uncoated, or can be coated with a hydrophobic material, to ensure that the pellets stick to the distal portion 32 and not to the other sidewalls of the vessel 18. With this arrangement, the pellets are less apt to be disturbed and re-mixed with the supernatant after centrifuging. On the other hand, when it is desired to capture a largely hydrophobic pellet, the sticky substance 36 applied to the distal portion 32 is hydrophobic. In such an embodiment, the remaining portion of the inner surface 28 can be uncoated or coated with a hydrophilic material.

Besides having an affinity for the pellets, the sticky substance 36 should also be relatively inert and compatible with the particular specimen 14. Stated differently, the sticky substance 36 should not contaminate the specimen 14. For example, a suitable hydrophilic material which can be used as the sticky substance 36 is a redox catalyst of sodium metabisulfite and ammonium bisulfate in a monomer of 2-hydroxyethyl methacrylate, as disclosed in U.S. Pat. No. 4,472,357, which substance is used to separate plasma from other blood components.

In an alternative embodiment, the "sticky substance" may be highly specific. For example, if one is seeking to separate a pellet of cells from the supernatant, the coating on the centrifuge tube may comprise an antibody to a component of those cells, or may comprise some other appropriate ligand. This example is intended to be illustrative, however, and not limiting.

FIG. 2 shows that the outer surface 26 of the vessel 18 can be contoured as appropriate for engaging the receptacle 16 of the centrifuge 12. In the specific embodiment shown in FIG. 2, the proximal portion of the outer surface 26 of the vessel 18 is generally cylindrical, whereas the distal portion of the outer surface 26 of the vessel 18 is generally tapered toward the closed, bottom end 20 of the vessel 18. In other words, the distal portion of the outer surface 26 is shaped generally as a conical frustum. As shown, the closed, bottom end 20 is rounded. It is to be understood, however, that the principles of the present invention can be applied to centrifuge tubes having shapes other than the shape of the preferred embodiment depicted herein.

Figure 2A:
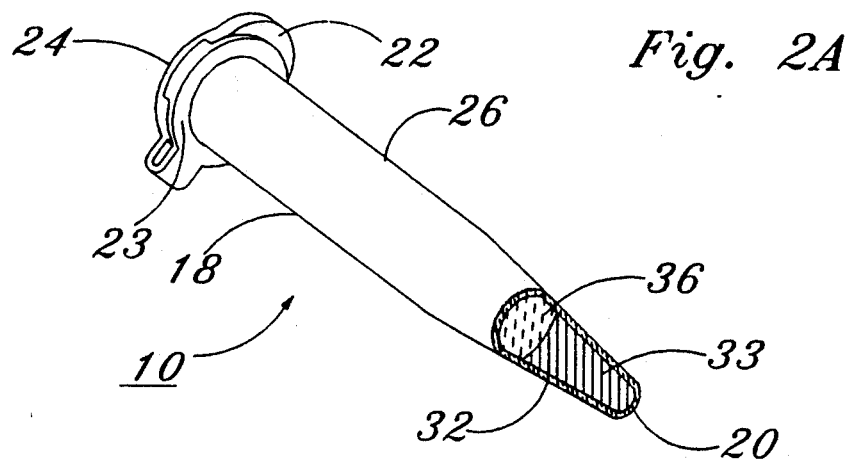
FIG. 2A is a perspective view of the centrifuge tube of the present invention, with portions cut away for clarity, shown with a pellet therein that has been separated from the supernatant of a specimen subsequent to centrifuging.

In accordance with the discussion above, the centrifuge tube 10 is typically used by infusing a specimen 14 into the vessel 18, engaging the cap 24 with the vessel 18 to cover the top end 22, and then engaging the vessel 18 with the centrifuge 12. The centrifuge 12 is activated to separate the supernatant 35 (FIG. 2A) from the solid phase of the specimen 14. This solid phase adheres to the roughened distal portion 32 in the form of a pellet 33 (FIG. 2A).

After centrifuging, the vessel 18 is removed from the centrifuge 12, the cap 24 removed from the top end 22, and the supernatant of the specimen 14 withdrawn by well-known means, e.g., by carefully pouring off the supernatant or by pipetting the supernatant out of the vessel 18. Importantly, however, the pellet 35 (FIG. 2A) that has adhered to the roughened distal portion 32 remains within the vessel 18 during removal of the supernatant.

In cross-reference to FIGS. 2, 3 and 4, the details of the manufacturing process of the centrifuge tube 10 can be seen. Preferably, the centrifuge tube 10 is made by injection molding, with the micropitted distal portion 32 of the centrifuge tube 10 being formed during the molding process. It is to be understood, however, that the micropits (these are shown in FIG. 2, but not 3 or 4) 34 of the micropitted portion 32 can also be formed after molding the centrifuge tube 10 by, for example, physically or chemically pitting the selected portion after the remainder of the tube 10 has been formed.

As shown in FIG. 3, a mold, generally designated 38, is preferably provided that has a base 40 and a core 42. Preferably, the core 42 is polished four hundred twenty (420) type stainless steel that has been heat hardened to a hardness factor of fifty six (56) on the Rockwell "C" scale, although other materials may be used. The base 40 is formed with a cavity 44, and the core 42 is slidably engageable with the cavity 44. Both the outer surface of a distal segment 46 of the core 42 and the cavity 44 are formed with the desired contour of the centrifuge tube 10. It will accordingly be appreciated that a tip 43 of the core 42 is preferably micropitted when the centrifuge tube 10 is to have micropits.

FIG. 3 further shows that the mold 38 includes a cover 48 that surrounds the core 42 when the core 42 is engaged with the cavity 44, and that abuts the base 40. As shown, the cover 48 has an annular opening 50 that is shaped to have the desired contour of the flange 23 of the centrifuge tube 10, shown in FIGS. 1 and 2. Also, a hollow gate 52 is formed in the base 40. The gate 52 establishes a pathway through which the material that is to ultimately form the centrifuge tube 10 can be injected into the cavity 44, in flowable form.

In cross-reference to FIGS. 3 and 4, after the core 42 has been made, e.g., by casting, forging, or machining, the tip 43 of the core 42 is polished to a mirror-like #2 finish on the Official SPI and SPE Mold Finish Scale, as indicated in FIG. 4. This polishing may be accomplished by any suitable means, e.g., by rubbing the tip 43 of the core 42 with 1200 grit paste that contains 15 micron diamond dust.

After polishing, the tip 43 of the core 42 is micropitted, as indicated in FIG. 4. This micropitting process can be accomplished by acid etching the tip 43 (i.e., by exposing the tip 43 to acid fumes). Preferably, however, the tip 43 is micropitted by holding the tip 43 in a "sandblasting" apparatus using glass beads as the abrasive. Suitable machinery for such a task would include a Dayton model sandblaster manufactured by Grainger (Corporation of Chicago, Illinois), which provides a nozzle that is movably positioned on a base, with the grit material blown by air through the nozzle. If desired, the nozzle of the Dayton model sandblaster also can be moved side-to-side and up-and-down.

The tip 43 is manually held in the sandblasting apparatus or machine held, in assembly-line fashion. Once positioned within the sandblasting apparatus, the tip 43 of the core 42 is exposed to a stream of glass beads that are ejected from the nozzle of the sandblaster and forcibly impinge on the tip 43, resulting in the formation of micropits on the surface thereof. In one presently preferred embodiment, the tip is treated with medium glass bead (#70–140) at one hundred pounds per square inch (100 PSI) pressure to micropit the tip 43. Preferably, the tip 43 is subjected to glass-beadblasting for two to five (2–5) minutes, and is rotated through about five rotations as the blasting nozzle of the apparatus moves side-to-side in a first plane relative to the tip 43. The tip 43 is then rotated through about five rotations as the blasting nozzle moves side-to-side in a second plane relative to the tip 43 which is perpendicular to the first plane.

As FIG. 4 next indicates, the core 42 is removed from the sandblasting apparatus and is engaged by well-known means with the mold 38. FIG. 4 also indicates that the tip 43 of the core 42 is next advanced into the cavity 44, and the cover 48 is positioned in an abutting relationship with the base 40 of the mold 38, as shown in FIG. 3.

Still referring to FIGS. 3 and 4, a material 54, in flowable form, that is to constitute the centrifuge tube 10 is injected through the gate 52 into the cavity 44. Also, some of the material 54 flows into the opening 50 of the cover 48 to form the flange 23 of the centrifuge tube 10. The tube material is then permitted to harden, creating the centrifuge tube 10. The skilled artisan will appreciate that when the centrifuge tube 10 hardens, the centrifuge tube 10 has a contour that is complementary to the contours of the cavity 44 and the core 42 of the mold 38.

Next, as indicated in FIG. 4, the core 42 and cover 48 are distanced from the base 40 of the mold 38 to the position shown in FIG. 5. This permits removal of the centrifuge tube 10 from the cavity 44. The process can be repeated as desired (see FIG. 4) by advancing the core 42 into the base 40 to appropriately configure the mold 38 for making another centrifuge tube (not shown). If desired, the sticky coating 36 (shown in FIG. 2) can be deposited on the inner surface 28 of the tube 10 by painting, vapor deposition, or any other suitable method well-known in the art.

The present invention also contemplates connecting a plurality of centrifuge tubes 10 together, to establish a centrifuge tube assembly (not shown). Stated differently, one or more centrifuge tubes can be interconnected to form a single large multi-tube assembly, in a configuration that is appropriate for permitting engagement of the assembly with the receptacles of a centrifuge. This multi-tube or "banked" assembly is conceptually similar to a microwell plate, with tubes substituting for depressions or wells. The plurality of tubes can be molded together, i.e., the assembly of tubes can be molded as a single unitary piece. Alternatively, the assembly can be established by connecting a plurality of separately-molded tubes. The separately-molded tubes can be connected by banding the tubes together, or by some other suitable means.

While the centrifuge tube for retaining pellets therein as herein shown and described in detail is fully capable of attaining the above-stated objects of the invention, it is to be understood that the preferred embodiment is exemplary, that the present invention fully contemplates other like embodiments, and that the scope of the present invention is accordingly to be limited by nothing other than the appended claims.

We claim:

1. A centrifuge tube for use in a centrifuge, comprising:
    a vessel having an open end and a closed end opposite the open end, the vessel defining an inner surface and an outer surface, the inner surface of the vessel having a pitted portion at the closed end of the vessel the remainder of the inner surface being free of pitting.

2. The tube recited in claim 1, wherein the centrifuge has a receptacle, and the vessel is shaped for operably engaging the receptacle.

3. The tube recited in claim 2, wherein the vessel is glass.

4. The tube recited in claim 2, wherein the vessel is plastic.

5. The tube recited in claim 1, wherein the vessel is made by molding, and the pitted portion is established during molding of the vessel.

6. The tube recited in claim 1, wherein the vessel is made by molding, and the pitted portion is established after the vessel is molded.

7. The tube recited in claim 6, wherein an erosive chemical is disposed in the vessel to establish the pitted portion.

8. The tube recited in claim 6, wherein the pitted portion is established by directing an erosive material against the inner surface of the vessel.

9. The tube recited in claim 1, further comprising a coating capable of retaining a precipitate, wherein the coating is deposited on the inner surface of the vessel.

10. The tube recited in claim 1, wherein the vessel is adapted to contain a specimen comprising separable supernatant and precipitate components, and wherein the pitted portion of the vessel has approximately the same volume as the precipitate, for retaining the precipitate therein.

11. A vessel for holding a specimen having a separable fluid constituent and a solid constituent, the vessel being adapted for use in a centrifuge device, the vessel comprising:
    a hollow vessel shell having an open end and a closed end, the closed end being adapted to be disposed axially outward when placed in the centrifuge, an inner surface and an outer surface;
    wherein at least a portion of the inner surface at the closed end, and only such portion, is provided with micropitting to facilitate precipitation and retention of the solid constituent thereon during and after centrifugation, such that decantation of the fluid constituent may be facilitated without dislodgement of the solid constituent.

12. The vessel recited in claim 11, wherein the centrifuge has a receptacle, and the vessel is shaped for operably engaging the receptacle.

13. The vessel recited in claim 11, wherein the solid constituent forms a pellet during centrifugation, and the vessel further includes a coating capable of attracting the pellet, wherein the coating is deposited on the inner surface of the vessel.

14. The vessel of claim 12 wherein
    the solid constituent forms a pellet during centrifugation; and
    the micropitted portion has approximately the same volume as that of the pellet.

* * * * *

UNITED STATES PATENT AND TRADEMARK OFFICE
CERTIFICATE OF CORRECTION

PATENT NO. : 5,234,667
DATED : AUGUST 10, 1993
INVENTOR(S) : RADTKE et al.

It is certified that error appears in the above-indentified patent and that said Letters Patent is hereby corrected as shown below:

COLUMN 3, LINE 56, THAT PORTION READING "FIG" SHOULD READ "FIG. 1,".

COLUMN 4, LINE 23, THAT PORTION READING "receptacle 14" SHOULD READ "receptacle 16".

COLUMN 4, LINE 30, THAT PORTION READING "phase 35" SHOULD READ "phase 36".

COLUMN 5, LINE 54, THAT PORTION READING "pellet 35" SHOULD READ "pellet 33".

Signed and Sealed this

Nineteenth Day of April, 1994

Attest:

Attesting Officer

BRUCE LEHMAN
Commissioner of Patents and Trademarks